United States Patent [19]
Ide

[11] Patent Number: 5,717,864
[45] Date of Patent: Feb. 10, 1998

[54] METHOD FOR JOINING A PLURALITY OF NETWORKS AND SECEDING THEREFROM

[75] Inventor: Akira Ide, Kawasaki, Japan

[73] Assignee: Fujitsu Limited, Kawasaki, Japan

[21] Appl. No.: 609,178

[22] Filed: Mar. 1, 1996

Related U.S. Application Data

[63] Continuation of Ser. No. 126,169, Sep. 24, 1993, abandoned.

[30] Foreign Application Priority Data

Sep. 25, 1992 [JP] Japan ................. 4-256329

[51] Int. Cl.$^6$ ............................. G06F 13/00; G06F 13/14
[52] U.S. Cl. ................. 395/200.06; 395/200.12; 370/462
[58] Field of Search ................. 395/200.06, 200.12; 370/461, 462, 522, 910; 364/DIG. 1

[56] References Cited

U.S. PATENT DOCUMENTS

| | | | |
|---|---|---|---|
| 5,150,464 | 9/1992 | Sidhu et al. | 395/200 |
| 5,166,931 | 11/1992 | Riddle | 370/94.1 |
| 5,282,270 | 1/1994 | Oppenheimer et al. | 395/200 |
| 5,313,465 | 5/1994 | Perlman et al. | 370/85.13 |
| 5,388,213 | 2/1995 | Oppenheimer et al. | 395/200 |

FOREIGN PATENT DOCUMENTS 0 474 427   3/1992   European Pat. Off. .

OTHER PUBLICATIONS

*Computer Communications Review*, No. 2, Apr. 1990, New York, NY, XP 000133723, Landweber et al., "An ISO TP4–TP0 Gateway," pp. 16–21.

*IBM Technical Disclosure Bulletin*, vol. 35, No. 3, Aug. 1992, XP 000326333, "Transparent Message Routing Between an SS#7 Network and X.25 Network," pp. 434–436.

Primary Examiner—Larry D. Donaghue
Assistant Examiner—Mark H. Rinehart
Attorney, Agent, or Firm—Staas & Halsey

[57] ABSTRACT

A method for joining and seceding from communications networks includes steps (a), (b) and (c). Step (a) is to register, at a first one of the communications networks indicated by first address information, second address information in first system definition information, the second address information registered in the first system definition information concerning the first one of the communications networks indicating a second one of the communications networks with which the first one of the communications networks requests to communicate. Step (b) is to register, at the first one of the communications networks, the second address information in second system definition information, the second address information registered in the second system definition information indicating that the first one of the communications networks is allowed to communicate with the second one of the communications networks. Step (c) is to assign, at the first one of the communications networks, a management number to the first address information and the second address information so as to be operatively linked together, whereby the first one of the communications networks can communicate with the second one of the communications networks by using the second system definition information referred to by the management number.

13 Claims, 6 Drawing Sheets

BEFORE CONNECTION

↓ JOIN ↓

AFFTER CONNECTION

↓ SECEDE ↓

5,717,864

METHOD FOR JOINING A PLURALITY OF NETWORKS AND SECEDING THEREFROM

This application is a continuation of application Ser. No. 08/126,169, filed Sep. 24, 1993, now abandoned.

BACKGROUND OF THE INVENTION

1. Field of the Invention

The present invention generally relates to a communications system including a plurality of networks, and more particularly to a method for joining such networks and seceding therefrom.

2. Description of the Prior Art

There is in present technology a communications system having a plurality of networks coupled to each other. Each communications network is allowed to communicate with one or a plurality of remote communications networks which are previously registered. If a communications network generates a request to communicate with (join) a remote communications network which has not been registered, a network system address indicating the above communications network is registered in the remote communications network, and a network system address indicating the remote communications network is registered in the communications network which has generated the above request.

When a communications network has a request to secede from the above remote communications network, the network system address indicating the communications network having the above request is deleted from the remote communications network, and the network system address indicating the remote communications network is also deleted from the communications network having the above request.

Conventionally, the registration and seceding processes are manually carried out in a state in which communications services provided by the communications networks being considered are interrupted.

SUMMARY OF THE INVENTION

It is an object of the present invention to provide a process for automatically joining a plurality of communications networks and seceding therefrom without interrupting communications services.

The above object of the present invention is achieved by a method for joining and seceding from communications networks, comprising the steps of:

(a) registering, at a first one of the communications networks indicated by first address information, second address information in first system definition information, the second address information registered in the first system definition information concerning the first one of the communications networks indicating a second one of the communications networks with which the first one of the communications networks requests to communicate;

(b) registering, at the first one of the communications networks, the second address information in second system definition information, the second address information registered in the second system definition information indicating that the first one of the communications networks is allowed to communicate with the second one of the communications networks; and (c) assigning, at the first one of the communications networks, a management number to the first address information and the second address information so as to operatively link together, whereby the first one of the communications networks can communicate with the second one of the communications networks by using the second system definition information referred to by the management number.

Preferably, the above method comprises the step of (d) registering, at the second one of the communications networks indicated by the second address information, the first address information in third system definition information together with the management number, the first address information registered in the third system definition information indicating that the second one of the communications networks is allowed to communicate with the first one of the communications networks.

Preferably, the above method comprises the steps of:

(d) deleting the second address information from the first system definition information when the first one of the communications networks stops a communication with the second one of the communications networks;

(e) deleting the second address information from the second system definition information when the first one of the communications networks stops the communication with the second one of the communications networks; and (f) canceling the management number when the first one of the communications networks stops said communication with the second one of the communications networks.

Preferably, the above method comprises the step of:

(e) deleting the second address information and the management number from the third system definition information when the first one of the communications networks stops a communication with the second one of the communications networks.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 1:
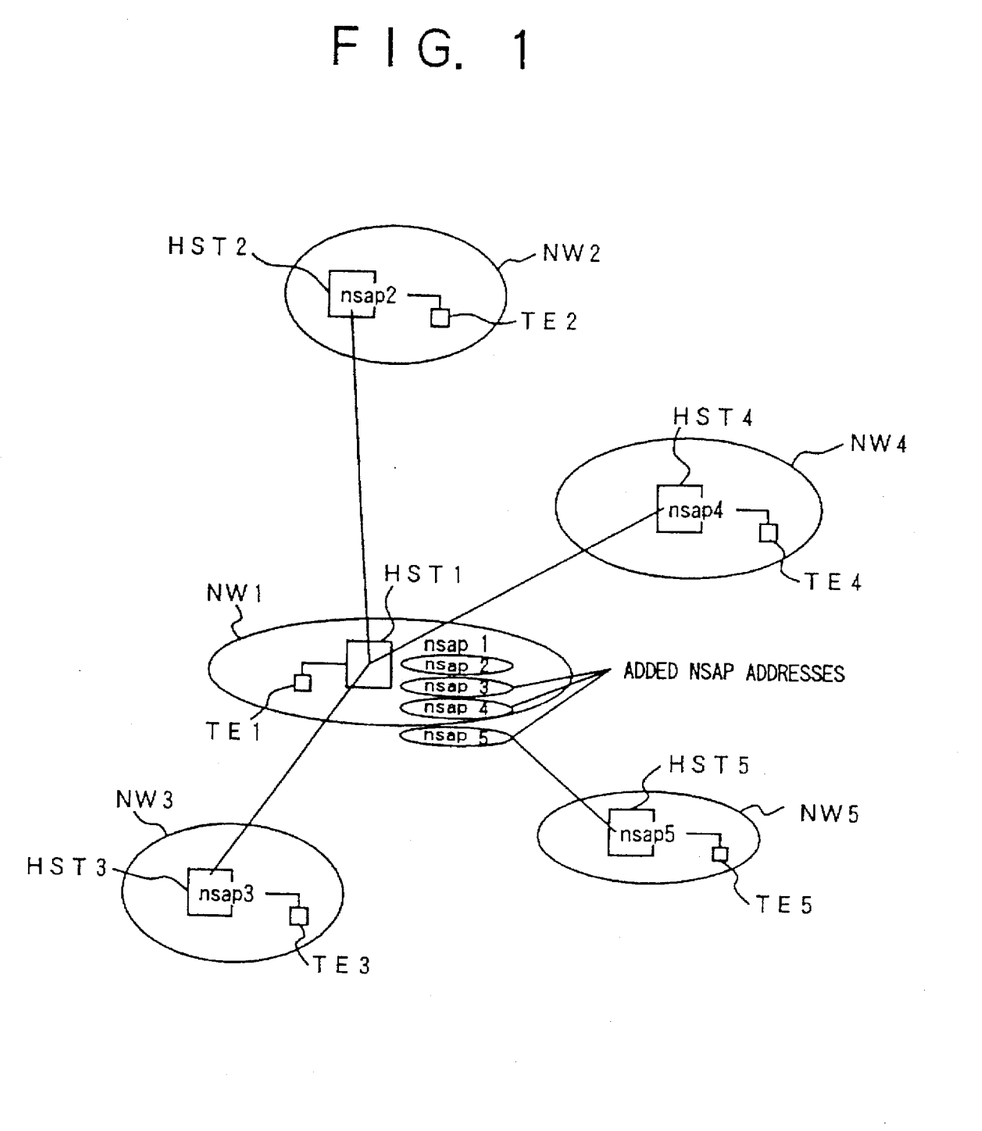
FIG. 1 is a diagram of a communication system having a plurality of communications networks according to an embodiment of the present invention.

FIG. 1 is a block diagram of a communications system having a plurality of communications networks NW1, NW2, NW3, NW4 and NW5. The communications network NW1 is connected to the communications networks NW2 through NW5 by means of communications media, such as cables.

The communications networks NW1 through NW5 respectively form their own systems. The communications networks NW1 through NW5 have respective host devices HST1 through HST5, to which terminals TE1 through TE5 are respectively connected. In practice, a plurality of terminals are accommodated in the networks NW1 through NW5.

Figure 2:
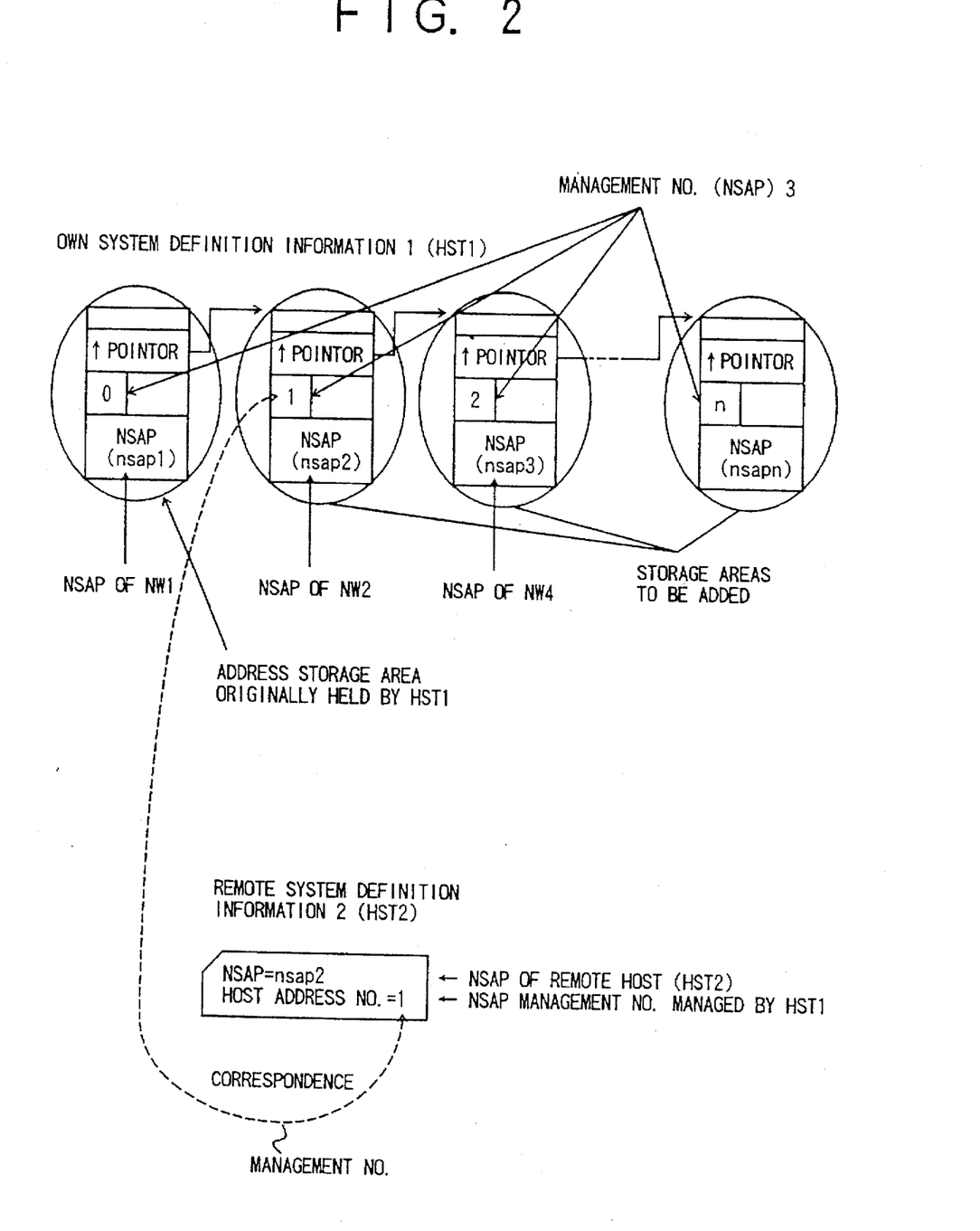
FIG. 2 is a diagram of a host's own system definition information and remote system definition information according to the embodiment of the present invention.

Each of the communications networks manages its own system definition information 1 as shown in FIG. 2. The information shown in FIG. 2 is information managed by the host device HST1 of the communications network NW1. Each of the other host devices HST2 through HST5 of the communications networks NW2 through NW5 manages its own system definition information in the same way as the host device HST1. For example, the network system addresses registered in the own system definition information 1 managed by the host device HST1 indicate the host devices (networks) that the host device NST1 (network NW1) joins and requests to communicate with.

More particularly, the system definition information 1 managed by the host device HST1 of the network NW1 includes an information item including a pointer, a management number 3 and a network system address (NSAP). The pointer is used to serially link items contained in the system definition information 1, as shown in FIG. 2. As shown in FIG. 2, the information items can be formed for the respective communications networks NW1 through NW5. In the case shown in FIG. 2, the information item shown on the leftmost side of FIG. 2 relates to the network NW1, and the information item next to the above item relates to the network NW2. The pointer of the information item relating to the network NW1 indicates the beginning of the information item relating to the network NW2.

The management number 3 is serially assigned to the information items. In the case shown in FIG. 2, the information items of the networks NW1, NW2 and NW4 are assigned management numbers 0, 1 and 2, respectively. The network system addresses nsap1, nsap2, nsap3, nsap4, . . . , nsapn (n is an integer equal to 5 in the communications system shown in FIG. 1) are assigned to the communications networks NW1 through NW5.

Each of the host devices HST1 through HST5 of the communications networks NW1 through NW5 manages, using the above-mentioned management number, the network system addresses of other remote networks as remote system definition information 2 shown in FIG. 2. The remote system definition information 2 shown in FIG. 2 is information managed by the host computer HST1 of the network NW1 and is related to the communications network NW2. The remote system definition information 2 managed by the host device HST1 includes a host address number of the network system address NSAP. In the case shown in FIG. 2, the network system address is nsap2, and the host address number is 1, which is the management number related to the communications network NW2 and managed by the host device HST1 of the network NW1. For example, the network addresses registered in the remote system definition information Z and managed by the host device HST1 indicate the host devices (networks) that the host device HST (network NW1) is capable of communicating with.

Figure 3A:
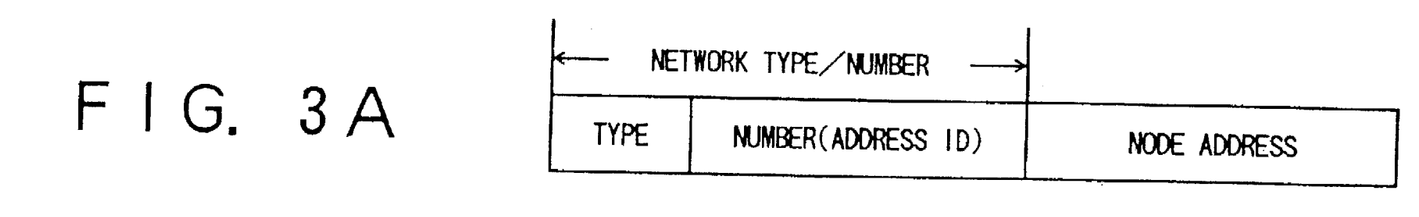
FIGS. 3A and 3B are diagrams of formats of a network system address according to the embodiment of the present invention.

FIG. 3A shows a format of the network system address NSAP of each of the host devices HST1 of the networks NW1 through NW5. The network system address NSAP includes information indicating the network type and the network identification number, and node addresses. The network type is, for example, a LAN (Local Area Network) or a WAN (Wide Area Network). The network identification number indicates the corresponding communications network. The node addresses indicate the addresses of nodes connected to the communications network related to the host device managing the network system address NSAP shown in FIG. 3A.

Figure 3B:
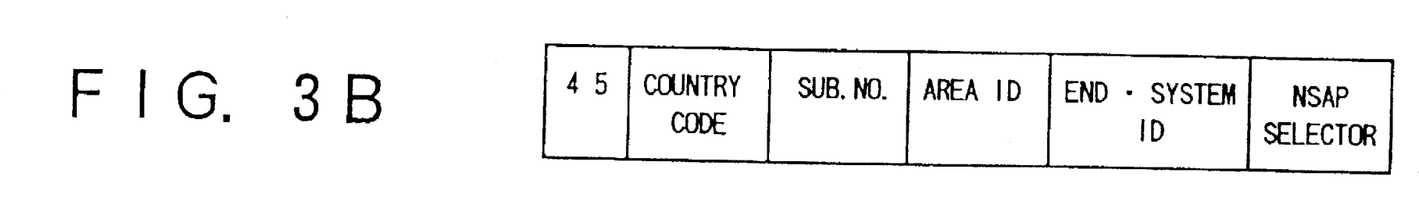

FIG. 3B shows the network system address NSAP according to the E. 184 format. As shown in FIG. 3B, the E. 184 format of the network system address NSAP includes:

45
country code
subscriber number
area ID
end-system ID
NSAP selector.

The host device HST1 of the network NW1 stores the system definition information items of the other networks with which the network NW1 requests to communicate. A description will now be given, with reference to FIGS. 4, 5 and 6, of a case where the host HST1 of the network NW1 generates a request to communicate with the host device HST2 of the network NW2 and the host device HST4 of the network NW4 when the host device HST1 is communicating with the terminal TE1.

Figure 4:
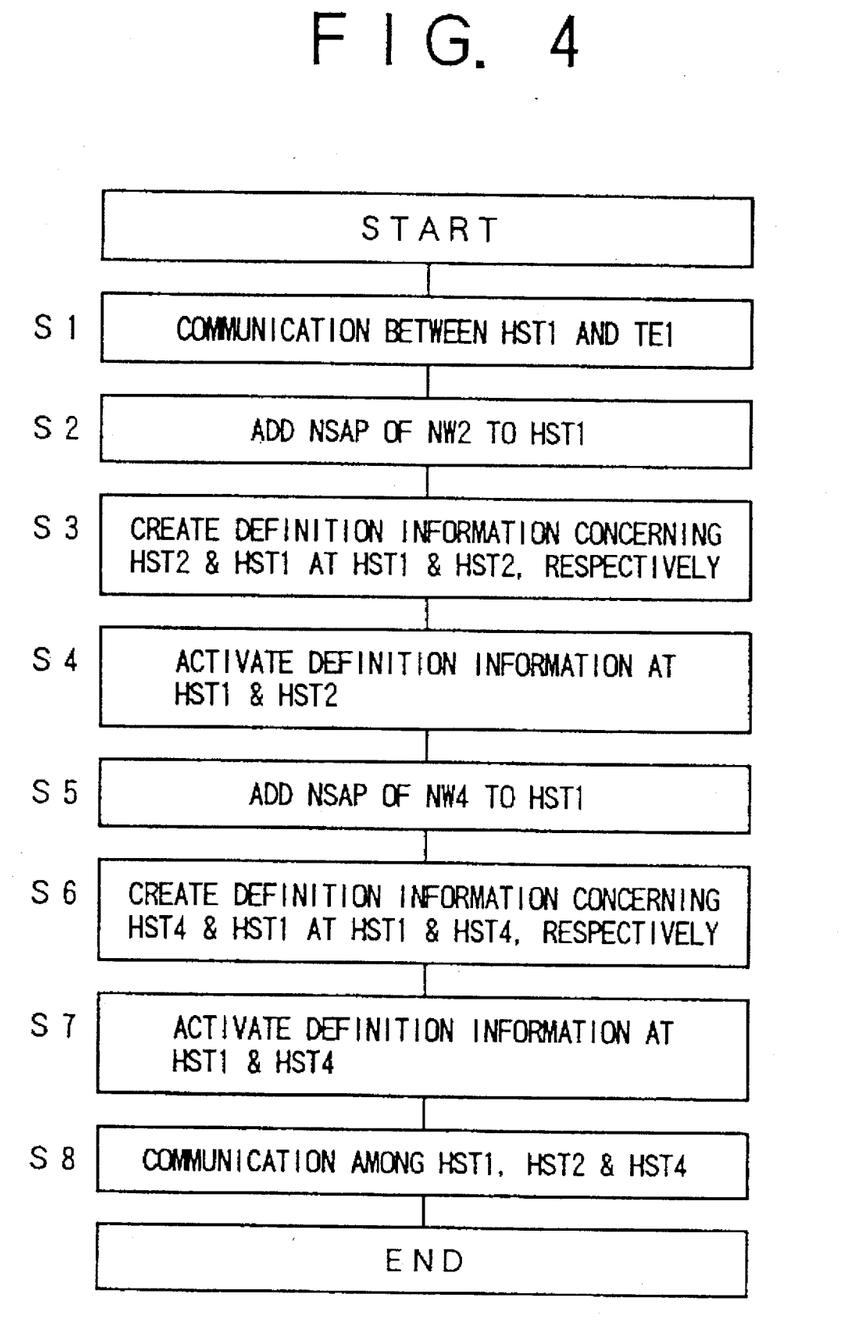
FIG. 4 is a flowchart of the operation of the embodiment of the present invention.

Referring to FIG. 4, the host device HST1 of the network NW1 communicates with terminal TE1 accommodated in the network NW1 in step S1. In step S2, the host device HST1 adds the network system address nsap2 of the network NW2 to the system definition information 1 managed by the host device HST1, as indicated by [1] in FIG. 6. Originally, the system definition information managed by the host device HST1 includes information concerning its own network NW1. In step S3, the host device HST1 creates system information concerning the remote network NW2, as indicated by [2] shown in FIG. 6, and the host device HST2 creates system information concerning the remote network NW1, as indicated by [3] shown in FIG. 6. The created system information concerning the network NW1 (host device HST1) is registered in the remote system definition information 2 managed by the host device HST2.

In step S4, the host device HST1 activates the system definition information concerning the network NW2, and the host device HST2 activates the system definition information concerning the network NW1. Thereby, the host device HST1 becomes capable of communicating with the host device HST2, and the host device HST2 becomes capable of communicating with the host device HST1. That is, the host device HST1 has joined the network NW2.

Figure 6:
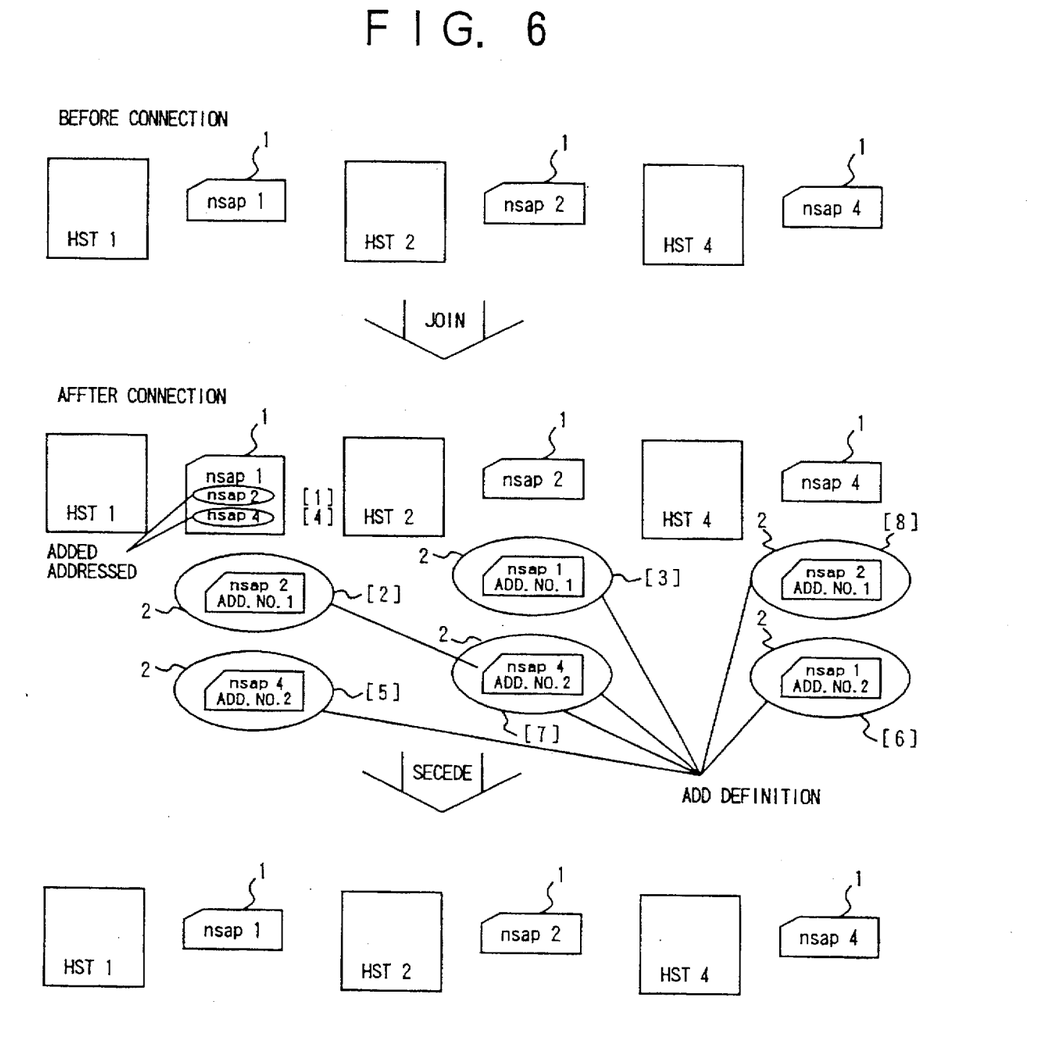
FIG. 6 is a diagram showing how host devices join networks and secede therefrom.

Similarly, in step S5, the host device HST1 adds the network system address nsap4 of the network NW4 to the system definition information 1 managed by the host device HST1, as indicated by [4] shown in FIG. 6. In step S6, the host device HST1 creates system information concerning the remote network NW4, as indicated by [5] shown in FIG. 6, and the host device HST4 creates system information concerning the remote network NW1, as indicated by [6] shown therein. The created system information concerning the remote network NW4 is registered in the remote system definition 2 managed by the host device HST1. The created system information concerning the network NW1 (host device HST1) is registered in the remote system definition information 2 managed by the host device HST4.

In step S7, the host device HST1 activates the system definition information concerning the network NW4, and the host device HST4 activates the system definition information concerning the network NW1. Thereby, the host device HST1 becomes capable of communicating with the host device HST4, and the host device HST4 becomes capable of communicating with the host device HST1. That is, the host device HST1 has joined the network NW4, and the host device HST4 has joined the network NW1.

Similarly, as indicated by [8] shown in FIG. 6, the system definition information concerning the host device HST2 is registered in the remote system definition information 2 managed by the host system HST4. Further, as indicated by [7] shown in FIG. 6, the system definition information concerning the host device HST4 is registered in the remote system definition information 2 managed by the host system HST2.

In step S8, communications among the host devices HST1, HST2 and HST4 take place. In the state in which the host device HST1 of the network NW1 is communicating with the terminal TE1, the host devices HST1, HST2 and HST4 mutually create their own system definition information 1 and the remote system definition information 2 and activate the own system definition information 1 and the remote system definition information 2. Hence, it becomes possible for the host devices HST1, HST2 and HST4 to communicate with one another.

Figure 5:
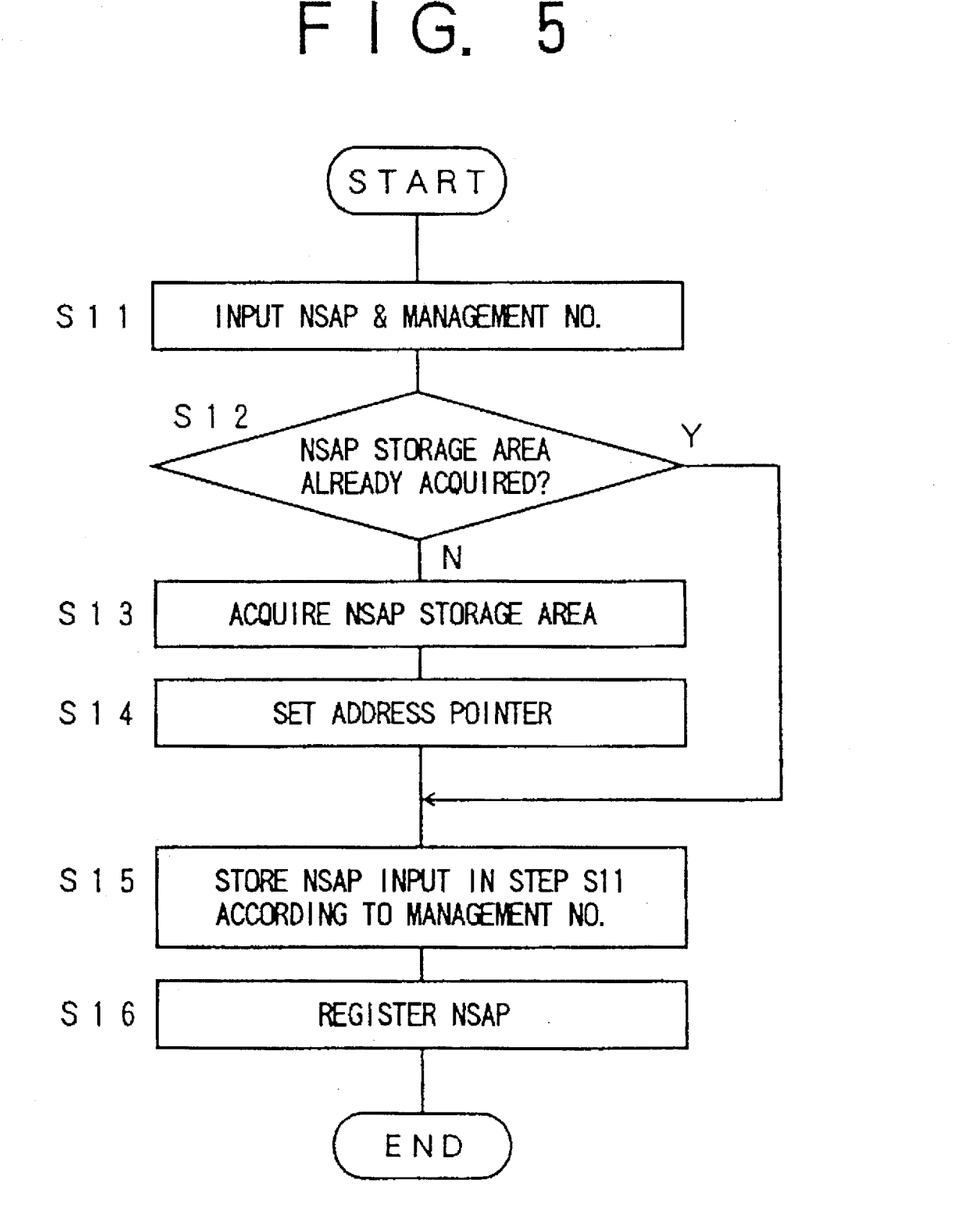
FIG. 5 is a flowchart of the operation of the embodiment of the present invention.

FIG. 5 is a flowchart of a process for adding the network system address NSAP to the system definition information. The process can be manually or automatically performed. In step S11, an operator of the host device HST1 of the network NW1 inputs a command to the host device HST1 via a keyboard or the like, and inputs a desired network system address NSAP and a management number corresponding to the desired network system address NSAP. For example, the operator inputs the network system address nsap2. At this time, the management number may be automatically assigned in response to the input of the network system address nsap2. In the case shown in FIG. 2, management number "1" is assigned to the network system address nsap2.

In step S12, it is determined whether or not a network system address (NSAP) storage area corresponding to the network system address input in step S11 has been captured. In FIG. 2, such a network system address storage area is indicated by an oval. When the result of step S12 is YES, step S15 is processed. When the result of step S12 is NO, in step S13, a network system address storage area corresponding to the network system address input in step S11 is captured. Then, in step S14, the pointer address indicating the captured storage area is set in the network system address storage area to which the captured storage area should be chained, as shown in FIG. 2.

In step S15, the network system address input in step S11 is stored in the network address storage area captured in step S13 in accordance with the management number. For example, the network system address nsap2 is stored in the storage area to which management number "3" is assigned. In step S16, the network system address NSAP is finally registered in the system definition information 1 managed by the host device HST1.

In the above-mentioned manner, if the storage area corresponding to the network system address input in step S11 has not been registered, the above storage area is dynamically captured and registered in connection with the management number, so that entry of the host device HST1 is completed.

As has been described previously, FIG. 6 shows how the own system definition information 1 and the remote system definition information 2 are set when communications among the networks NW1, NW2 and NW4 take place. Before the own system definition information 1 and the remote system definition information 2 are updated, the host devices HST1, HST2 and HOST4 have their own system definition information 1 as follows:

HST1: nsap1
HST2: nsap2
HST4: nsap4.

After the host devices HST1, HST2 and HST4 are mutually connected and communications can take place between these devices, the host device HST1 has its own system definition information as follows:

HST1: nsap1, nsap2, nsap4.

Further, the host device HST1 has the following remote system definition information 2:

nsap2, address no. "1" regarding HST2 (NW2)
nsap4, address no. "2" regarding HST4 (NW4).

As has been described previously, the address number corresponds to the management number. That is, the address number "1" corresponds to the management number "1". The host device HST2 has its own system definition information 1 indicating only its own address nsap2, and the remote system definition information 2 indicating the remote networks (host devices) nsap1 and nsap4. By referring to the remote system definition information 2, the host device HST2 can communicate with the host devices HST1 and HST4. Similarly, the host device HST4 manages its own system definition information 1 and the remote system definition information 2.

As shown in FIG. 1 and FIG. 6, the own system definition information 1 and the remote system definition information 2 are registered so that the own system definition information 1 and the remote system definition information 2 are linked by the management number. Hence, the networks NW1, NW2 and NW4 can communicate with one another.

Further, FIG. 6 shows how to secede from the networks. In the seceding procedure, items of the remote system definition information 2 indicated by ovals are deleted from the host devices HST1, HST2 and HST4.

Each of the host devices HST1 through HST5 includes a CPU, a memory, a communications controller, and an input/output device. Similarly, each of the terminals TE1 through TE5 has a CPU, a memory, a communications controller and an input/output device. It will be noted that the hardware configurations of the host devices and the terminals are known.

It is possible for the terminal to perform the procedures shown in FIGS. 4 through 6 instead of the host devices.

The present invention is not limited to the specifically disclosed embodiments, and variations and modifications may be made without departing from the scope of the present invention.

What is claimed is:

1. A method for joining and seceding from communications networks, comprising the steps of:

(a) registering, at a first one of the communications networks indicated by first address information, second address information in first system definition information, said second address information registered in the first system definition information indicating a second one of the communications networks with which said first one of the communications networks requests to communicate;

(b) registering, at said first one of the communications networks, said second address information in second system definition information, the second address information registered in the second system definition information indicating that said first one of the communications networks is allowed to communicate with the second one of the communications networks, and said second system definition information being linked to said first system definition information; and (c) assigning, at said first one of the communications networks, a management number corresponding to the first address information and a management number corresponding to the second address information for operatively linking the first address information and the second address information together and allowing said first one of the communications networks to communicate with said second one of the communications networks by using the second system definition information.

2. The method as claimed in claim 1, further comprising:

(d) registering, at the second one of the communications networks indicated by the second address information, the first address information in third system definition information together with a management number corresponding to the first address information in the third system definition information, the first address information registered in the third system definition information indicating that said second one of the communications networks is allowed to communicate with said first one of the communications networks.

3. The method as claimed in claim 1, further comprising the steps of:

(d) deleting the second address information from the first system definition information when said first one of the communications networks stops a communication with the second one of the communications networks;

(e) deleting the second address information from the second system definition information when said first one of the communications networks stops said communication with the second one of the communications networks; and (f) canceling the management number corresponding to the second address information when said first one of the communications networks stops said communication with the second one of the communications networks.

4. The method as claimed in claim 2, further comprising the step of:

(e) deleting the second address information and the management number corresponding to the second address information in the third system definition information from the third system definition information when said first one of the communications networks stops a communication with the second one of the communications networks.

5. The method as claimed in claim 1, wherein said second address information contains information indicating the structure of said second one of the communications networks.

6. The method as claimed in claim 1, wherein:

the step (a) comprises the step of forming a first storage area in which the first definition information is stored; and the step (b) comprises the step of forming a second storage area in which the second definition information is stored, and the management numbers operatively link the first storage area and the second storage area.

7. A method for allowing a communication network to join in, and secede from, communication with other communication networks, each communication network having corresponding address information and corresponding system definition information, and a first communication network desires to communicate with a second communication network, the method comprising:

registering address information corresponding to the second communication network into the system definition information of the first communication network;

assigning, in the first communication network, a respective management number to the address information corresponding to the first communication network and a respective management number to the address information corresponding to the second communication network and registered into the system definition information of the first communication network; and using the assigned management numbers to link the address information corresponding to the first communication network to the address information of the second communication network and allow the first communication network to communicate with the second communication network.

8. The method as claimed in claim 7, further comprising:

registering the address information corresponding to the first communication network into the system definition information of the second communication network;

assigning, in the second communication network, a respective management number to the address information corresponding to the second communication network and a respective management number to the address information corresponding to the first communication and registered into the system definition information of the second communication network; and using the management numbers assigned in the second communication network to link the address information corresponding to the first communication network and the address information corresponding to the second communication network.

9. The method as claimed in claim 8, further comprising, when the first communication network no longer desires to communicate with the second communication network, the steps of:

removing the address information corresponding to the second communication network from the system definition information of the first communication network;

removing the address information corresponding to the first communication network from the system definition information of the second communication network; and cancelling, in the first communication network, the management number assigned to the address information corresponding to the second communication network.

10. The method as claimed in claim 8, further comprising, when the first communication network no longer desires to communicate with the second communication network, the steps of:

removing the address information corresponding to the first communication network from the system definition information of the second communication network; and cancelling, in the second communication network, the management number assigned to the address information corresponding to the first communication network.

11. The method as claimed in claim 7, wherein the address information corresponding to the second communication network indicates the structure of the second communication network.

12. The method as claimed in claim 7, wherein each network includes network storage areas for storing the system definition information corresponding to the respective network, the method further comprising the steps of:

forming, in the first communication network, a first storage area in which the address corresponding to the first network is stored; and forming, in the first communication network, a second storage area in which the registered address information corresponding to the second communication network is stored, wherein the assigned management numbers link the first storage area to the second storage area.

13. A method for allowing a communication network to join in, and secede from, communication with other communication networks, each communication network having corresponding address information indicating an address of the respective communication network, corresponding system definition information indicating other communication networks to which the respective communication network is currently configured for communicating with, and corresponding remote system definition information providing information for linking together each communication network indicated by the system definition information, and a first communication network desires to communicate with a second communication network, the method comprising:

registering the address information corresponding to the second communication network into the system definition information and the remote system definition information of the first communication network, to configure the first communication network for communicating with the second communication network; and registering the address information corresponding to the first communication network into the system definition information and the remote system definition information of the second communication network, to configure the second communication network for communicating with the first communication network.

* * * * *